United States Patent
Kikuchi et al.

(10) Patent No.: US 7,510,036 B2
(45) Date of Patent: Mar. 31, 2009

(54) POWER CONVERSION DEVICE AND VEHICLE EQUIPPED THEREWITH

(75) Inventors: Takaji Kikuchi, Toyota (JP); Takeshi Menjo, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 574 days.

(21) Appl. No.: 11/369,966

(22) Filed: Mar. 8, 2006

(65) Prior Publication Data

US 2006/0211287 A1  Sep. 21, 2006

(30) Foreign Application Priority Data

Mar. 18, 2005 (JP) .............................. 2005-079577

(51) Int. Cl.
*B60K 1/00* (2006.01)
(52) U.S. Cl. .................. 180/65.1; 180/274; 180/312; 903/951; 903/952; 296/187.03
(58) Field of Classification Search ................ 180/65.1, 180/271, 274, 281, 311, 312; 903/951, 952; 296/187.03, 187.09
See application file for complete search history.

(56) References Cited

U.S. PATENT DOCUMENTS

| | | | | |
|---|---|---|---|---|
| 5,476,151 A | * | 12/1995 | Tsuchida et al. | 180/274 |
| 5,906,410 A | * | 5/1999 | Dalinkiewicz | 296/24.4 |
| 6,494,286 B2 | * | 12/2002 | Shimizu et al. | 180/299 |
| 7,185,723 B2 | * | 3/2007 | Aoyama et al. | 180/68.4 |
| 7,213,671 B2 | * | 5/2007 | Hirayu | 180/291 |
| 7,392,782 B2 | * | 7/2008 | Fujii | 123/198 D |
| 2005/0205316 A1 | * | 9/2005 | Yamafuji | 180/68.5 |
| 2006/0201753 A1 | * | 9/2006 | Yamafuji | 188/65.1 |

FOREIGN PATENT DOCUMENTS

| JP | A 06-270697 | 9/1994 |
|---|---|---|
| JP | A 2001-097052 | 4/2001 |
| JP | A 2003-009301 | 1/2003 |
| JP | A 2004-082940 | 3/2004 |

\* cited by examiner

*Primary Examiner*—Christopher P Ellis
*Assistant Examiner*—John D Walters
(74) *Attorney, Agent, or Firm*—Oliff & Berridge, PLC

(57) ABSTRACT

A cover accommodates a power converter receiving high voltage. A connector assembling portion to which a connector of an external power line is assembled is arranged external to the cover and secured by a securing member to a vehicle's main body. A support member is arranged at a lower surface of the cover and connector assembling portion, rather than that portion of casing connecting the connector assembling portion and the power converter's main body, between the cover and the connector assembling portion and thus binds them together.

10 Claims, 4 Drawing Sheets

POWER CONVERSION DEVICE AND VEHICLE EQUIPPED THEREWITH

This nonprovisional application is based on Japanese Patent Application No. 2005-079577 filed with the Japan Patent Office on Mar. 18, 2005, the entire contents of which are hereby incorporated by reference.

BACKGROUND OF THE INVENTION

1. Field of the Invention

The present invention relates generally to power conversion devices and vehicles equipped therewith, and particularly to structures of power conversion devices considering passive safety against collision.

2. Description of the Background Art

Hybrid vehicles, electric vehicles and other similar vehicles employing an electric motor as a motive power source are equipped with inverters, converters and other similar power conversion devices. These power conversion devices receive high voltage corresponding to the high-power motor. Accordingly, passive safety against collision must sufficiently be considered.

Japanese Patent Laying-Open No. 2001-097052 discloses a structure employed to attach a vehicular accessory component that provides improved safety against collision. This structure allows an accessory component disposed in a vehicle's engine room to be arranged to incline relative to the vehicle's fore-aft direction and assembled to a reinforcement member of the vehicle via a support member also assembled to the reinforcement member simply by engagement to allow the accessory component to be movable when the engine room is compressed and thus deformed.

This structure can prevent the accessory component from transferring an impact rearward in a collision and also prevent a harness of the like's disconnection to provide a high level of safety against collision.

Japanese Patent Laying-Open No. 2001-097052, however, does not particularly consider the accessory component's deformation and damage caused by collision. For example, for the sake of cost reduction and handability, a power conversion device can have a connector assembling portion external to a casing of the main body of a power converter to assemble a connector of an external power line, and secured to the vehicle's main body to secure the power conversion device to the vehicle's main body.

For such arrangement, if the vehicle collides and the casing accordingly receives external force, the external force is concentrated at the connector assembling portion connected to the vehicle's main body and the connector assembling portion, which receives high voltage, may be deformed and damaged. Furthermore, the deformed and damaged connector assembling portion may contact and as a result deform or damage the casing and hence the main body of the power converter accommodated in the casing. As a power conversion device is often arranged at a position higher than a vehicle's bumper, it may severely be deformed, damaged or the like when the vehicle collides with an object higher in level than the bumper.

Accordingly it is necessary not only to prevent the accessory component from transferring an impact rearward when the vehicle collides, as described in Japanese Patent Laying-Open No. 2001-097052, but also protect the power conversion device against deformation and damage to provide improved passive safety against collision. Furthermore, there is a strong demand for reduction in cost and size for hybrid, electric and other similar vehicles, and reduced cost and smaller space as well as effectively improved passive safety are required.

The arrangement disclosed in Japanese Patent Laying-Open No. 2001-097052 requires a space for ensuring the accessory component's displacement, which also prevents the vehicle from having a reduced size.

SUMMARY OF THE INVENTION

The present invention has been made to overcome such disadvantage and it contemplates a power conversion device that can provide reduced cost and saved space, and improved passive safety.

The present invention also contemplates a vehicle equipped with a power conversion device that can provide reduced cost and saved space, and improved passive safety.

The present power conversion device includes: a power converter; an enclosure accommodating the power converter; a connector assembling portion disposed external to the enclosure and having assembled thereto a connector of an external power line communicating power with the power converter; a securing member securing the connector assembling portion to a main body of a vehicle; and a support member disposed at a portion other than a portion connecting the connector assembling portion and the enclosure, the support member being arranged between and binding the connector assembling portion and the enclosure.

Preferably the power converter includes an inverter.

For the present power conversion device, if the vehicle collides and the enclosure accommodating the power converter experiences external force, the support member bears a portion of force exerted to a portion connecting the connector assembling portion and the enclosure. This can prevent the external force from being concentrated at the portion connecting the connector assembling portion and the enclosure and thus protect the connector assembling portion against deformation and damage attributed to stress concentration and hence prevent the connector assembling portion from contacting the enclosure of the power converter.

Thus the present power conversion device can protect the connector assembling portion and the power converter against damage and allows improved passive safety against collision. The enclosure and the connector assembling portion can remain unchanged in structure and a minimally required member (i.e., the support member) suffices. Reduced cost and saved space can thus be achieved.

Preferably the portion connecting the connector assembling portion and the enclosure is located at a first end of a portion having the enclosure and the connector assembling portion opposite to each other and the support member is arranged between and binds the connector assembling portion and the enclosure in the portion having the enclosure and the connector assembling portion opposite to each other at a second end opposite to the first end.

For the present power conversion device, the support member is arranged in a portion having the enclosure and the connector assembling portion opposite to each other at an end (a second end) opposite to a portion connecting the connector assembling portion and the enclosure. External force exerted when the vehicle collides can be dispersed across the connector assembling portion and the enclosure via the portion connecting the connector assembling portion and the enclosure, and the support member.

Thus the present power conversion device can effectively avoid exerted external force's concentration to further ensure that the connector assembling portion and the power converter can be protected against damage.

Preferably the power conversion device further includes a reinforcement member reinforcing that portion of the enclosure opposite to the connector assembling portion.

If the vehicle collides and resultant external force causes the connector assembling portion to deform and thus contact the enclosure of the power converter, the reinforcement member that reinforces that portion of the enclosure opposite to the connector assembling portion can protect the enclosure against deformation and damage.

Thus the present power conversion device can further ensure that the power converter accommodated in the enclosure can be protected against damage.

Preferably the power conversion device further includes a reinforcement member reinforcing that portion of the enclosure engaged with the support member.

That portion of the enclosure which is engaged with the support member has stress concentration, which deforms and damages the enclosure. In the present power conversion device, the portion of the enclosure that is engaged with the support member can be reinforced by a reinforcement member. The enclosure can thus be protected against deformation and damage.

Thus the present power conversion device can further ensure that the power converter accommodated in the enclosure can be protected against damage.

Furthermore the present vehicle has the present power conversion device mounted therein at a front portion in an engine room.

If the present vehicle collides and its engine room is compressed and thus deformed and the enclosure accommodating the power converter experiences external force, the support member can bear a portion of force exerted to a portion connecting the connector assembling portion and the enclosure. This can prevent external force from being concentrated at the portion connecting the connector assembling portion and the enclosure, and as a result protect the connector assembling portion against deformation and damage attributed to stress concentration and hence prevent the connector assembling portion from contacting the enclosure of the power converter.

Thus the present vehicle can protect the power conversion device against damage despite collision and provide improved passive safety against collision. The enclosure and the connector assembling portion can remain unchanged in structure and a minimally required member (i.e., the support member) suffices. Reduced cost and saved space can thus be achieved.

Thus the present invention can exhibit improved passive safety against collision while reduced cost and saved space can still be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in embodiments will be described more specifically with reference to the drawings. In the figures, identical or corresponding components are identically denoted.

First Embodiment

Figure 1:
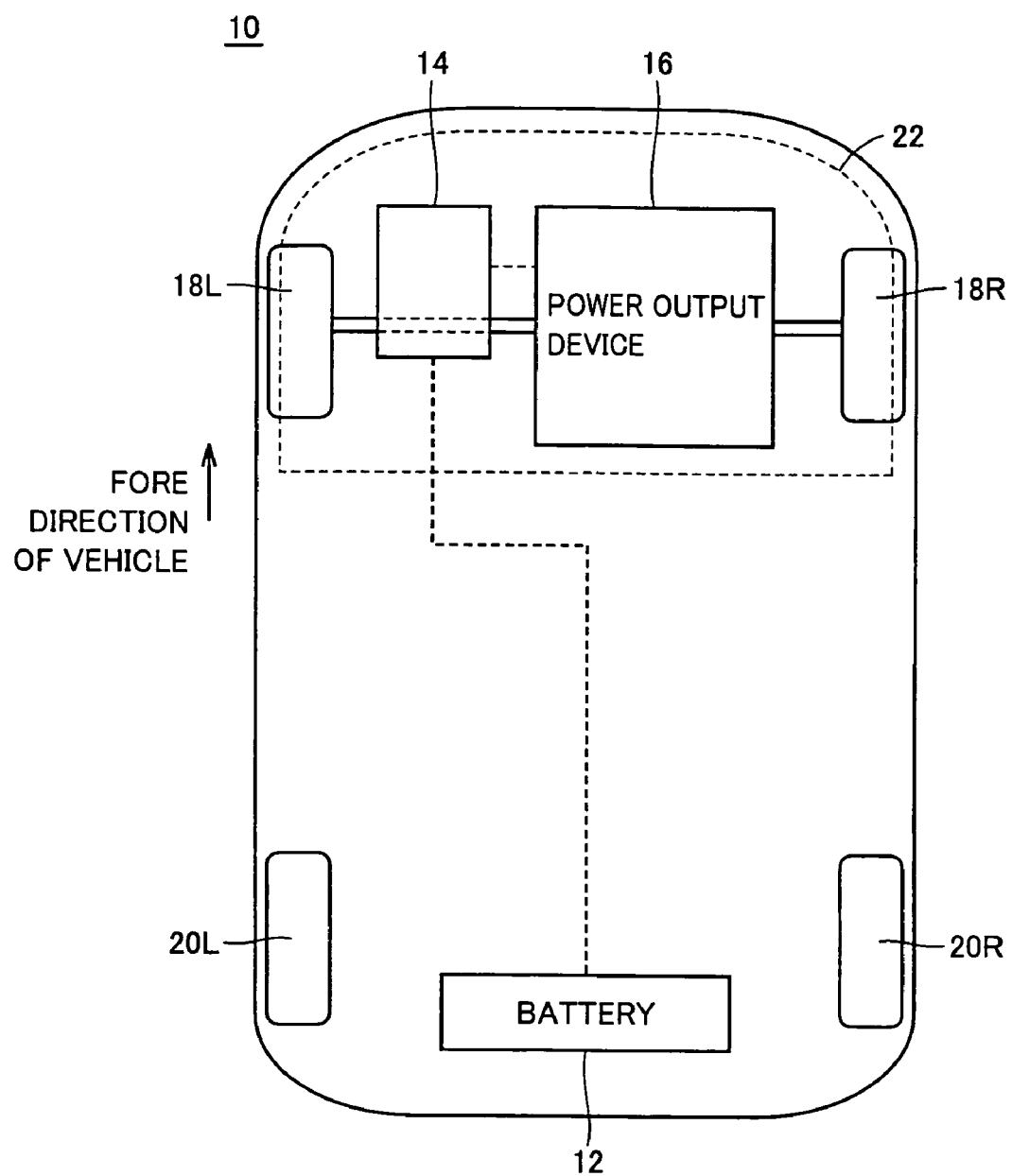
FIG. 1 schematically shows a configuration of a hybrid vehicle shown as one example of a vehicle in a first embodiment of the present invention.

FIG. 1 schematically shows a configuration of a hybrid vehicle shown as one example of a vehicle in a first embodiment of the present invention. More specifically the figure shows a hybrid vehicle 10 including a battery 12, a power control unit (PCU) 14, power output device 16, front wheels 18R, 18L, and rear wheels 20R, 20L.

Battery 12 is a chargeable and dischargeable battery, such as a nickel metal hydride, lithium ion, or similar secondary battery. Battery 12 is mounted in the vehicle for example at a rear portion and generates a direct current (DC) power supplied to PCU 14 and receives DC power output from PCU 14 and stores the DC power therein.

PCU 14 is arranged in an engine room 22 located in the vehicle at a front portion. PCU 14 receives DC voltage from battery 12 and converts the DC voltage to alternate current (AC) voltage which is in turn output to a motor generator (not shown) included in power output device 16. Furthermore, PCU 14 receives AC voltage generated by the motor generator and converts the AC Voltage to DC voltage which is in turn output to battery 12.

Power output device 16 includes an engine (not shown) and the motor generator and is arranged in engine room 22. Power output device 16 generates power by the motor generator and/or the engine and outputs the power to a drive shaft to drive front wheels 18R, 18L. Furthermore, power output device 16 utilizes rotation of front wheels 18R, 18L and an output received from the engine to allow the motor generator to generate power which is in turn output to PCU 14.

Front wheels 18R, 18L are driving wheels of hybrid vehicle 10, and rear wheels 20R, 20L are driven wheels of the vehicle.

Figure 2:
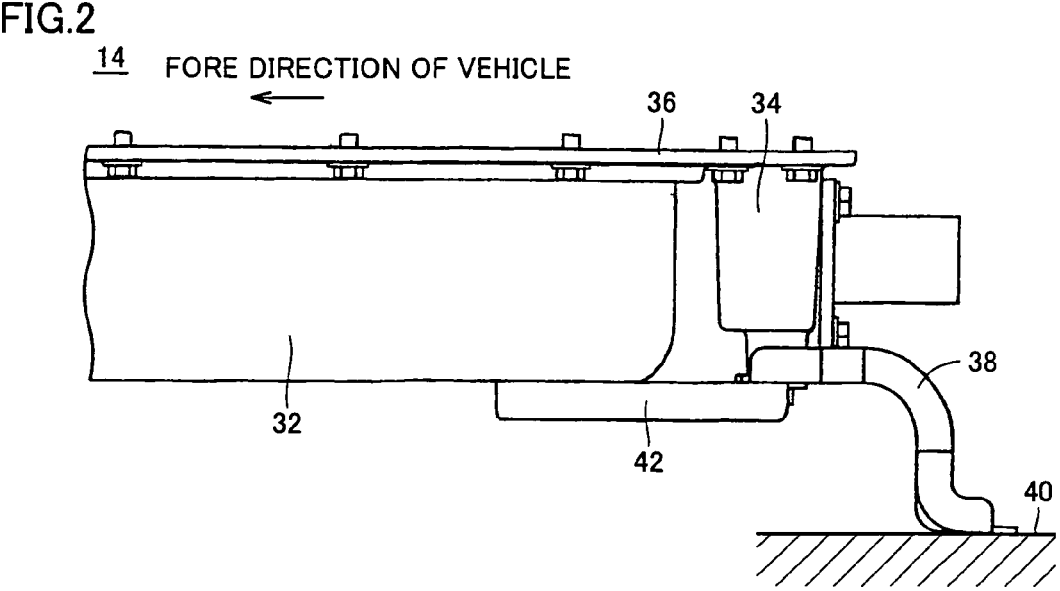
FIG. 2 is a side view of a PCU shown in FIG. 1.
Figure 3:
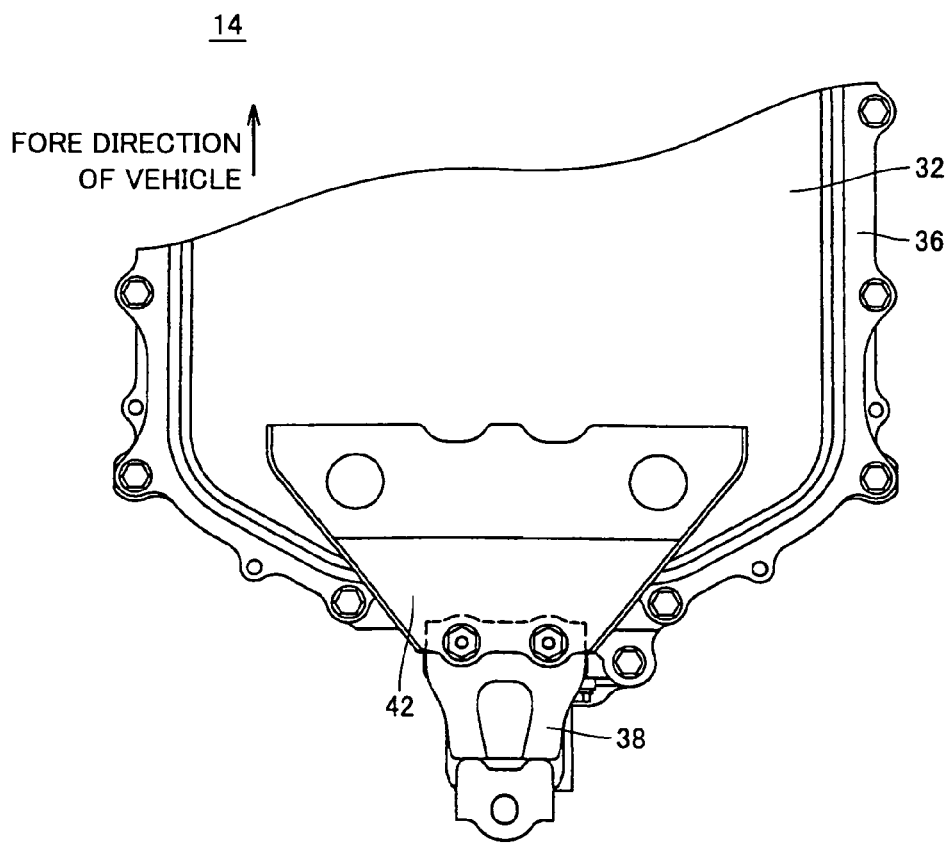
FIG. 3 is a plan view of a CPU shown in FIG. 2, as seen upward.

FIG. 2 is a side view of PCU 14 shown in FIG. 1, and FIG. 3 is a plan view of PCU 14 shown in FIG. 2, as seen upward. With reference to FIGS. 2 and 3, PCU 14 includes an inverter, an up converter or a similar power converter (not shown), a cover 32, a connector assembling portion 34, a casing 36, a securing member 38, and a support member 42.

Cover 32 is formed of a thin plate of metal, e.g., iron. Cover 32 accommodates the inverter, the up converter or the similar power converter. Cover 32 is bolted to casing 36.

Connector assembling portion 34 is provided to assemble to PCU 14 a connector of an external power line communicating power with the power converter accommodated in cover 32. More specifically, the external power line has the connector assembled to connector assembling portion 34, and connector assembling portion 34 electrically connects the external power line to the power converter. For the sake of cost reduction and handability, connector assembling portion 34 is arranged external to cover 32, separated from the main body of the power converter. Connector assembling portion 34 and a casing 36 are integrally molded.

Casing 36 is formed of a thin plate of metal, e.g., aluminum. Casing 36 has secured thereto the power converter accommodated in cover 32. More specifically, the power converter is secured to casing 36 and cover 32 is attached from under casing 36.

Securing member 38 secures connector assembling portion 34 in the engine room to the vehicle's main body 40. More specifically, as cover 32 is removable and also insufficient in strength, connector assembling portion 34 molded to be integral with casing 36 is secured to the vehicle's main body 40.

Support member 42 is implemented by a member having a level of strength and formed for example of iron or a similar metal. Support member 42 is provided to bind cover 32 and connector assembling portion 34 at their respective lower surfaces in the first embodiment. If the vehicle collides and external force is exerted from the vehicle's front side toward PCU 14, support member 42 can bear a portion of force transferred from cover 32 via casing 36 to connector assembling portion 34 and thus alleviate stress concentration caused in a vicinity of an upper portion of connector assembling portion 34.

In other words, introducing support member 42 connecting connector assembling portion 34 to cover 32 allows cover 32 to bear external force received when the vehicle collides. Thus the external force received when the vehicle collides is borne by cover 32, connector assembling portion 34, casing 36 and support member 42 together to prevent deformation and damage attributed to stress concentration.

Furthermore, support member 42 is arranged to bind cover 32 and connector assembling portion 34 on their respective lower surfaces (or a second end) opposite to casing 36 located at an upper side (or a first end) of cover 32 and connector assembling portion 34. External force received when the vehicle collides can be dispersed across cover 32 and connector assembling portion 34 to effectively alleviate stress concentration.

Thus providing support member 42 can alleviate stress concentration caused in the vicinity of the upper portion of connector assembling portion 34 when the vehicle collides. Connector assembling portion 34 can thus be protected against deformation and damage and hence prevented from colliding against cover 32, and the power converter accommodated in cover 32 can be protected against damage.

Figure 4:
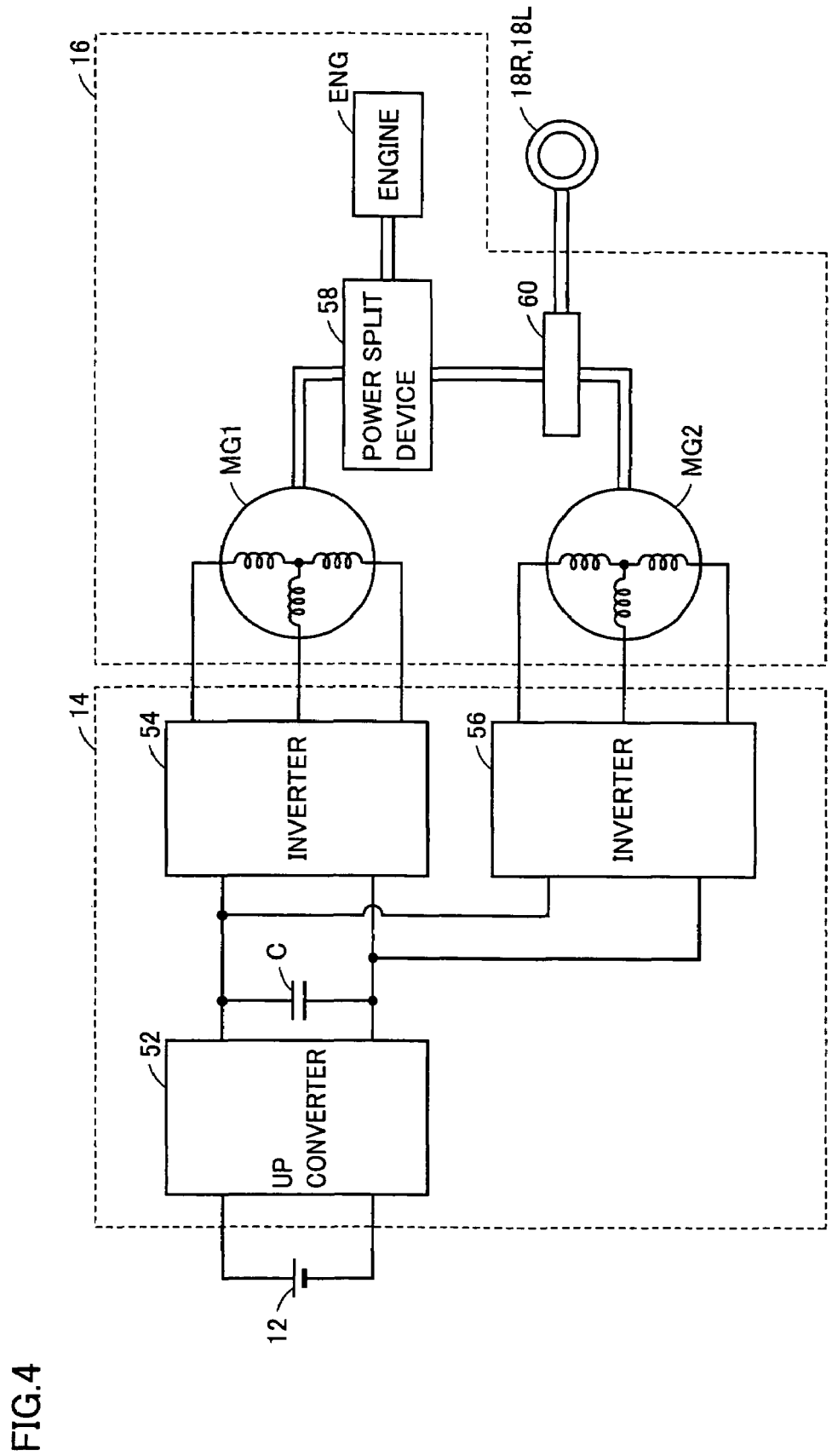
FIG. 4 is a block diagram generally showing a power train of the FIG. 1 hybrid vehicle.

FIG. 4 is a block diagram generally showing a power train of hybrid vehicle 10 shown in FIG. 1. With reference to FIG. 4, PCU 14 includes an up converter 52, an inverter 54, 56, and a smoothing capacitor C. Power output device 16 includes a motor generator MG1, MG2, a power split device 18, a gear 60, and an engine ENG.

Up converter 52 up converts DC voltage received from battery 12 and outputs the up converted DC voltage to inverter 54, 56. Furthermore, up converter 52 receives DC voltage from inverter 54, 56 and down converts the DC voltage to charge battery 12.

Inverter 54 receives DC voltage from up converter 52 and converts the DC voltage to AC voltage to drive motor generator MG1. Furthermore, inverter 54 rectifies AC voltage generated by motor generator MG1 and outputs the rectified DC voltage to up converter 52.

Inverter 56 receives DC voltage from up converter 52 and converts the DC voltage to AC voltage to drive motor generator MG2. Furthermore, inverter 56 rectifies AC voltage generated by motor generator MG2 and outputs the rectified DC voltage to up converter 52.

Motor generator MG1 is incorporated into hybrid vehicle 10 as a component operating as a power generator driven by engine ENG. Furthermore, motor generator MG2 is incorporated into hybrid vehicle 10 as an electric motor driving front wheels 18R, 18L serving as driving wheels of hybrid vehicle 10.

Motor generator MG1, MG2 is a rotary electric machine implemented for example by a 3-phase AC synchronous motor generator. Motor generator MG1 employs an output of engine ENG to generate 3-phase AC voltage which is in turn output to inverter 54. Furthermore, motor generator MG1 receives 3-phase AC voltage from inverter 54 to produce driving force to start engine ENG. Motor generator MG2 receives 3-phase AC voltage from inverter 56 to generate a torque driving hybrid vehicle 10. Furthermore, motor generator MG2 in regeneratively braking hybrid vehicle 10 generates and outputs 3-phase AC voltage to inverter 56.

Engine ENG drives front wheels 18R, 18L via power split device 58 and gear 60, and also provides motor generator MG1 with force to rotate it. Furthermore, engine ENG receives driving force from motor generator MG1 to start.

Power split device 58 divides an output of engine ENG into force driving front wheels 18R, 18L and that rotating motor generator MG1. Furthermore, power split device 58 in starting engine ENG receives driving force from motor generator MG1 and transmits it to engine ENG. Gear 60 reduces a rate of rotation received from motor generator MG2 and power split device 58 and outputs it to front wheels 18R and 18L.

Thus in the first embodiment connector assembling portion 34 and cover 32 can be bound by support member 42 to alleviate stress concentration caused in a vicinity of a portion connecting connector assembling portion 34 and casing 36. Thus connector assembling portion 34 can be protected against deformation and damage and hence prevented from colliding against cover 32 and damaging the power converter. Thus hybrid vehicle 10 can be improved in passive safety.

Furthermore, cover 32 and connector assembling portion 34 can remain unchanged in structure. Improved passive safety can be achieved with a minimally required component, or support member 42, which does not prevent hybrid vehicle 10 from being reduced in cost and size.

Second Embodiment

Figure 5:
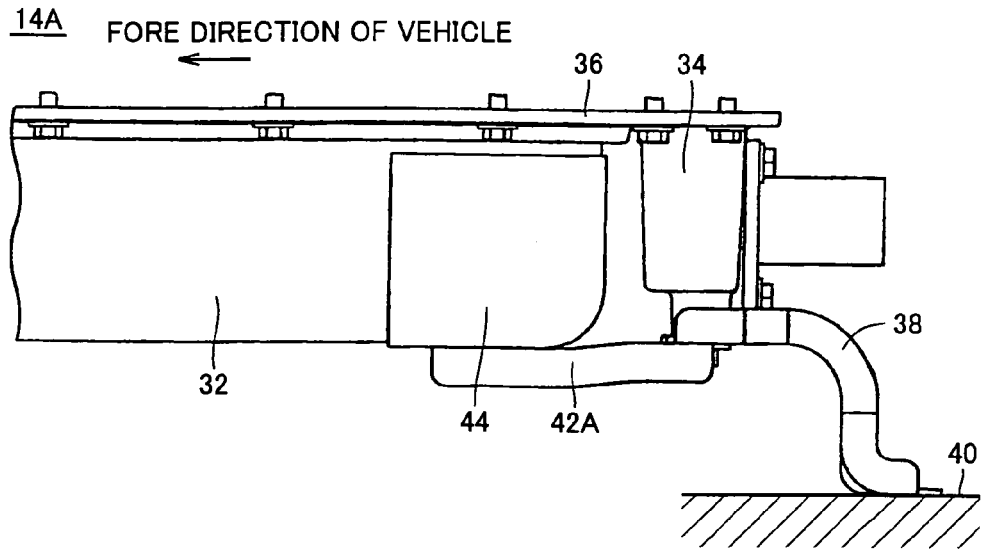
FIG. 5 is a side view of a PCU in a second embodiment of the present invention.
Figure 6:
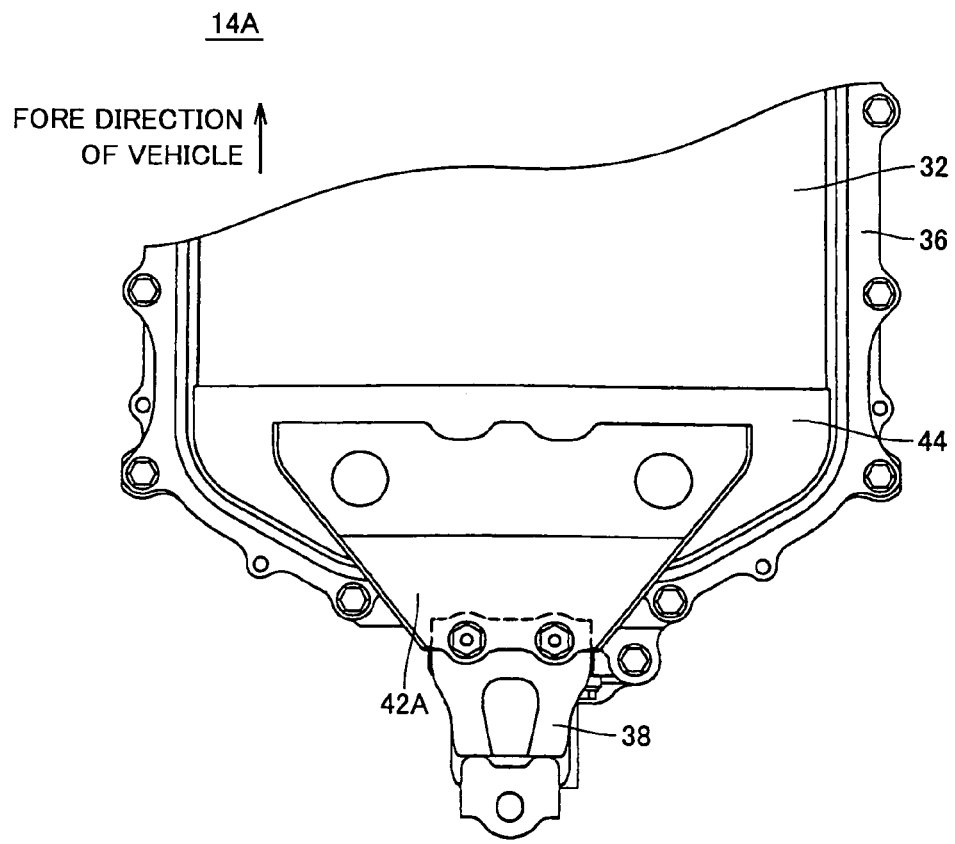
FIG. 6 is a plan view of a CPU shown in FIG. 5, as seen upward.

FIG. 5 is a side view of a PCU in a second embodiment of the present invention and FIG. 5 is a plan view of the FIG. 5 PCU as seen upward. With reference to FIGS. 5 and 6 a PCU 14A corresponds to PCU 14 described in the first embodiment with reference to FIGS. 2 and 3 plus a reinforcement member 44 and having support member 42 replaced with a support member 42A.

Reinforcement member 44 extends a portion of cover 32 that is opposite to connector assembling portion 34 along an external periphery of cover 32 toward the vehicle's front side to cover a portion of an external surface of cover 32. Reinforcement member 44 has a lower surface with support member 42A joined thereto.

Reinforcement member 44 is provided in order to reinforce the portion of cover 32 that is opposite to connector assembling portion 34. More specifically, if the vehicle collides and connector assembling portion 34 is deformed or damaged, reinforcement member 44 prevents connector assembling portion 34 from directly contacting and thus deforming and damaging cover 32 and as a result damaging the power converter accommodated in cover 32.

Furthermore, reinforcement member 44 is also intended to reinforce a vicinity of a portion engaging cover 32 and support member 42A together. More specifically, cover 32 is formed of thin plate, and if the support member is joined directly to cover 32 and an external force having some magnitude is exerted to cause stress concentration in the portion joining the support member to cover 32, cover 32 may be deformed. Accordingly, reinforcement member 44 is provided to cover a portion of cover 32 and support member 42A is joined to reinforcement member 44. Reinforcement member 44 allows cover 32 and support member 42A to transfer force therebetween via the entirety of a portion at which cover 32 and reinforcement member 44 contact. This can alleviate stress concentration in a vicinity of a portion engaging cover 32 and support member 42A together and thus protect cover 32 against deformation and damage.

Support member 42A is identical in structure to support member 42 described in the first embodiment except that the former is provided between and binds reinforcement member 44 and connector assembling portion 34. When the vehicle collides and external force is exerted from the vehicle's front side toward PCU 14A, support member 42A can also bear a portion of force transferred from cover 32 via casing 36 to connector assembling portion 34 and thus alleviate stress concentration caused in a vicinity of an upper portion of connector assembling portion 34.

Note that the second embodiment provides the hybrid vehicle in the same general configuration and provides a power train in the same configuration as hybrid vehicle 10 of the first embodiment.

Note that while in the above description reinforcement member 44 is provided along an external surface of cover 32, alternatively cover 32 may be increased in thickness at a portion corresponding to reinforcement member 44 to increase cover 32 itself in strength. Alternatively, the reinforcement member may be arranged along an internal surface of cover 32.

Thus in the second embodiment cover 32 can be reinforced by reinforced member 44. If the vehicle collides and an external force is accordingly exerted to deform connector assembling portion 34, connector assembling portion 34 can be prevented from directly contacting cover 32. Furthermore, a portion of cover 32 that is engaged with the support member can also be protected against deformation and damage to further ensure that the power converter accommodated in cover 32 can be protected against damage.

While in the first and second embodiments support members 42 and 42A are triangular as shown in FIGS. 3 and 6, they are not limited to such geometry.

Furthermore while in the above description cover 32 has been described as a member separate from casing 36 and adapted to be bolted to casing 36, alternatively cover 32 and casing 36 may be integrally molded.

Furthermore while in the above description battery 12 has been described as chargeable and dischargeable secondary battery, battery 12 may alternatively be a fuel cell. Furthermore, while in the above description PCU 14 and 14A are adapted to be mounted in a hybrid vehicle, the present invention is applicable to a range that is not limited to a power conversion device mounted in a hybrid vehicle. It may be mounted in an electric vehicle, a fuel cell vehicle, or the like.

Note that cover 32 described above corresponds to an enclosure in the present invention. Furthermore, reinforcement member 44 corresponds in the present invention to a reinforcement member reinforcing a portion opposite to a connector assembling portion and a reinforcement member reinforcing a portion engaged with a support member.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power conversion device comprising:
a power converter;
an enclosure accommodating said power converter;
a connector assembling portion disposed external to said enclosure and having assembled thereto a connector of an external power line communicating power with said power converter;
a securing member securing said connector assembling portion to a main body of a vehicle; and
a support member disposed at a portion other than a portion connecting said connector assembling portion and said enclosure, said support member being arranged between and binding said connector assembling portion and said enclosure.

2. The power conversion device according to claim 1, wherein:
said portion connecting said connector assembling portion and said enclosure is located at a first end of a portion having said enclosure and said connector assembling portion opposite to each other; and
said support member is arranged between and binds said connector assembling portion and said enclosure in said portion having said enclosure and said connector assembling portion opposite to each other at a second end opposite to said first end.

3. The power conversion device according to claim 1, further comprising a reinforcement member reinforcing that portion of said enclosure opposite to said connector assembling portion.

4. The power conversion device according to claim 1, further comprising a reinforcement member reinforcing that portion of said enclosure engaged with said support member.

5. The power conversion device according to claim 1, wherein said power converter includes an inverter.

6. A vehicle having the power conversion device of claim 1 mounted therein at a front portion in an engine room.

7. A vehicle having the power conversion device of claim 2 mounted therein at a front portion in an engine room.

8. A vehicle having the power conversion device of claim 3 mounted therein at a front portion in an engine room.

9. A vehicle having the power conversion device of claim 4 mounted therein at a front portion in an engine room.

10. A vehicle having the power conversion device of claim 5 mounted therein at a front portion in an engine room.

* * * * *